United States Patent
Lee et al.

(10) Patent No.: US 10,413,869 B2
(45) Date of Patent: Sep. 17, 2019

(54) COMPOSITE HOLLOW FIBER MEMBRANE AND MANUFACTURING METHOD THEREOF

(71) Applicant: KOLON INDUSTRIES, INC., Gwacheon-si, Gyeonggi-do (KR)

(72) Inventors: Ah Reum Lee, Yongin-si (KR); Jae Hun Lee, Yongin-si (KR); Yong-Cheol Shin, Yongin-si (KR); Heewan Moon, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 143 days.

(21) Appl. No.: 15/108,998

(22) PCT Filed: Dec. 24, 2014

(86) PCT No.: PCT/KR2014/012779
§ 371 (c)(1),
(2) Date: Jun. 29, 2016

(87) PCT Pub. No.: WO2015/102292
PCT Pub. Date: Jul. 9, 2015

(65) Prior Publication Data
US 2016/0325236 A1    Nov. 10, 2016

(30) Foreign Application Priority Data

Dec. 31, 2013  (KR) .................. 10-2013-0168105

(51) Int. Cl.
*B01D 67/00* (2006.01)
*B01D 69/08* (2006.01)
(Continued)

(52) U.S. Cl.
CPC ......... *B01D 69/12* (2013.01); *B01D 67/0002* (2013.01); *B01D 69/08* (2013.01);
(Continued)

(58) Field of Classification Search
CPC ........ B01D 69/02; B01D 69/04; B01D 69/08; B01D 69/10; B01D 69/12; B01D 2325/40;
(Continued)

(56) References Cited

U.S. PATENT DOCUMENTS

| | | |
|---|---|---|
| 6,354,444 B1 | 3/2002 | Mahendran et al. |
| 2003/0134550 A1 | 7/2003 | Lee et al. |

(Continued)

FOREIGN PATENT DOCUMENTS

| | | |
|---|---|---|
| EP | 2448658 A1 | 5/2012 |
| HU | 0201735 A2 | 9/2002 |

(Continued)

OTHER PUBLICATIONS

International Searching Authority, International Search Report for PCT/KR2014/012779 dated Mar. 18, 2015.
Hungarian Patent Office; Communication dated Jan. 18, 2017 in counterpart application No. P1600620.
Korean Intellectual Property Office; Communication (Notice to Grant) dated Dec. 28, 2018 in counterpart application No. 10-2013-0168105.

*Primary Examiner* — Pranav N Patel
(74) *Attorney, Agent, or Firm* — Sughrue Mion, PLLC (57) ABSTRACT

A composite hollow fiber membrane having improved water permeability and peel strength and a manufacturing method thereof are disclosed. The composite hollow fiber membrane includes a tubular polymer membrane having an outer surface and an inner surface, and a tubular braid disposed between the outer surface and the inner surface of the tubular polymer membrane, the tubular braid comprises a plurality of yarns, each of the yarns includes first multifilaments and second multifilaments, each of the first multifilaments includes a plurality of first monofilaments having fineness of 3 to 50 denier, and each of the second multifilaments includes a plurality of second monofilaments having fineness of 0.4 to 3 denier.

9 Claims, 3 Drawing Sheets

(51) Int. Cl.
*B01D 69/12* (2006.01)
*B01D 71/68* (2006.01)
*B01D 71/26* (2006.01)
*B01D 71/34* (2006.01)
*B01D 71/64* (2006.01)

(52) U.S. Cl.
CPC .............. *B01D 71/68* (2013.01); *B01D 71/26* (2013.01); *B01D 71/34* (2013.01); *B01D 71/64* (2013.01); *B01D 2325/20* (2013.01); *B01D 2325/24* (2013.01); *B01D 2325/40* (2013.01)

(58) Field of Classification Search
CPC ............ B01D 2325/24; B01D 2325/20; B01D 71/68; B01D 71/26; B01D 71/34; B01D 71/64; B01D 63/027; B01D 67/0002; B01D 2313/23
See application file for complete search history.

(56) References Cited

U.S. PATENT DOCUMENTS

| | | |
|---|---|---|
| 2009/0206026 A1 | 8/2009 | Yoon et al. |
| 2010/0024631 A1 | 2/2010 | Lee et al. |
| 2011/0114553 A1 | 5/2011 | Teramachi et al. |
| 2013/0248440 A1 | 9/2013 | Seo et al. |

FOREIGN PATENT DOCUMENTS

| | | | |
|---|---|---|---|
| HU | 230009 B1 | | 5/2015 |
| JP | 2009297642 A | | 12/2009 |
| KR | 10-2004-0008935 A | | 1/2004 |
| KR | 10-2008-0048147 A | | 6/2008 |
| KR | 10-2012-0053955 A | | 5/2012 |
| KR | 10-1244484 B1 | | 3/2013 |
| WO | WO2012067380 | * | 5/2012 |

* cited by examiner

COMPOSITE HOLLOW FIBER MEMBRANE AND MANUFACTURING METHOD THEREOF

CROSS REFERENCE TO RELATED APPLICATIONS

This application is a National Stage of International Application No. PCT/KR2014/012779 filed Dec. 24, 2014, claiming priority based on Korean Patent Application No. 10-2013-0168105 filed Dec. 31, 2013, the contents of all of which are incorporated herein by reference in their entirety.

BACKGROUND OF THE INVENTION

Field of the Invention

The present invention relates to a composite hollow fiber membrane and a manufacturing method thereof and, more particularly, to a composite hollow fiber membrane having improved water permeability and peel strength and a manufacturing method thereof.

Description of the Related Art

Separation methods for fluid treatment include a separation method using heating or phase change, a separation method using a filtration membrane, etc. A separation method using a filtration membrane is advantageous in that desired water quality may be stably acquired according to pore sizes of the filtration member and thus process reliability may be increased and manipulation, such as heating, etc., is not required due to use of the filtration membrane and thus such a separation method may be widely used in a separation process using microorganisms which may be influenced by heating.

Filtration membranes may be classified into flat sheet membranes and hollow fiber membranes according to shapes.

A hollow fiber membrane having a hollow formed therein has a much greater surface area than a flat sheet membrane and is thus advantageous in terms of water treatment efficiency. Hollow fiber membranes are widely used in microfiltration, such as manufacture of aseptic water, potable water and pure water, etc., and application thereof is now increased to sewage/wastewater treatment, solid-liquid separation in a septic tank, removal of suspended solids (SS) from industrial wastewater, filtration of river water, filtration of industrial water, filtration of swimming pool water, etc.

In order to apply a filtration membrane to water treatment, the filtration membrane should have excellent permeability and simultaneously have excellent pressure resistance and mechanical strength. However, a hollow fiber membrane has insufficient mechanical strength alone due to characteristics of a porous structure thereof. In order to increase mechanical strength of a hollow fiber membrane, trials to reinforce the hollow fiber membrane with a tubular braid have been executed.

For example, U.S. Pat. Nos. 7,909,177 and 8,201,485 respectively disclose composite hollow fiber membranes, each of which is manufactured by coating the outer surface of a tubular braid, serving as a support, with a polymer membrane.

In this documents, in order to increase a contact area between the tubular braid and the polymer membrane, the tubular braid is manufactured using thin multifilaments including monofilaments having fineness of 0.01 to 0.4 denier alone or by combining the thin multifilaments with other fabrics.

However, the tubular braid including the thin multifilaments has small pores and thus lowers water permeability of the composite hollow fiber membrane.

Moreover, the small pores of the tubular braid including the thin multifilaments prevent a polymer solution from permeating the tubular braid in the thickness direction thereof when the polymer membrane is formed. Consequently, improvement of peel strength between the tubular braid and the polymer membrane is limited.

Further, since the polymer solution does not permeate the tubular braid in the thickness direction thereof, the inner surface of the tubular braid becomes the inner surface of the composite hollow fiber membrane. The tubular braid has the non-uniform inner surface due to characteristics of the braid itself. The non-uniform inner surface of the tubular braid increases resistance to a fluid flow within the composite hollow fiber membrane, thus lowering water permeability of the composite hollow fiber membrane.

SUMMARY OF THE INVENTION

Accordingly, the present invention is directed to a composite hollow fiber membrane and a manufacturing method thereof that substantially obviate one or more problems due to limitations and disadvantages of the related art.

An object of the present invention is to provide a composite hollow fiber membrane having excellent water permeability and peel strength.

Another object of the present invention is to provide a manufacturing method of a composite hollow fiber membrane having excellent water permeability and peel strength.

Additional advantages, objects, and features of the invention will be set forth in part in the description which follows and in part will become apparent to those having ordinary skill in the art upon examination of the following or may be learned from practice of the invention.

In accordance with an aspect of the present invention, the above and other objects can be accomplished by the provision of a composite hollow fiber membrane including a tubular polymer membrane having an outer surface and an inner surface and a tubular braid disposed between the outer surface and the inner surface of the tubular polymer membrane, wherein the tubular braid comprises a plurality of yarns, each of the yarns includes first multifilaments and second multifilaments, each of the first multifilaments includes a plurality of first monofilaments having fineness of 3 to 50 denier, and each of the second multifilaments includes a plurality of second monofilaments having fineness of 0.4 to 3 denier.

Each of the first multifilaments may include 30 to 150 first monofilaments, and each of the second multifilaments may include 20 to 100 first monofilaments.

The first multifilaments may have fineness of 100 to 600 denier, and the second multifilaments may have fineness of 10 to 200 denier.

Each of the yarns may include 1 to 4 first multifilaments and 1 to 4 second multifilaments, and the sum of the number of the first filaments and the number of the second multifilaments included in each yarn may be three or more.

Each of the yarns may have fineness of 150 to 800 denier.

The tubular braid may be manufactured using 8 to 60 yarns.

The first and second monofilaments may include at least one of polyolefin resin, polyethylene terephthalate resin and polyamide resin, and the polymer membrane may include at least one of polysulfone resin, polyether sulfone resin, sulfonated polysulfone resin, polyvinylidene fluoride resin, polyacrylonitrile resin, polyimide resin, polyamideimide resin and polyesterimide resin.

The tubular braid may have an external diameter of 1.2 to 2.0 mm, and a ratio of the thickness of the tubular braid to the external diameter of the tubular braid may be 15 to 35%.

A distance between the inner surface of the polymer membrane and the tubular braid may be 1 to 50% of the thickness of the tubular braid.

In accordance with another aspect of the present invention, there is provided a manufacturing method of a composite hollow fiber membrane, including manufacturing first multifilaments, each first multifilament including a plurality of first monofilaments having fineness of 3 to 50 denier, manufacturing second multifilaments, each second multifilament including a plurality of second monofilaments having fineness of 0.4 to 3 denier, manufacturing a plurality of yarns using the first multifilaments and the second multifilaments, braiding the yarns to manufacture a tubular braid, and supplying a polymer solution to the outer surface of the tubular braid.

In supply of the polymer solution of the outer surface of the tubular braid, the polymer solution may pass through the tubular braid in the thickness direction of the tubular braid.

Supply of the polymer solution of the outer surface of the tubular braid may include causing the tubular braid to pass through an inner tube of a double tubular nozzle, and spinning the polymer solution through an outer tube of the double tubular nozzle. Supply of the polymer solution of the outer surface of the tubular braid may include dipping the tubular braid in the polymer solution.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

Now, a composite hollow fiber membrane and a manufacturing method thereof in accordance with the present invention will be described in detail with reference to accompanying drawings.

In the description of the present invention, term a "thin multifilament" is defined as a multifilament including monofilaments having fineness of 0.01 to 0.4 denier, and term a "middle multifilament" is defined as a multifilament including monofilaments having fineness of 0.4 to 3 denier. In addition to the thin multifilament and the middle multifilament, a multifilament including monofilaments having fineness of 3 denier or more is generally classified as "thick multifilament".

Figure 1:
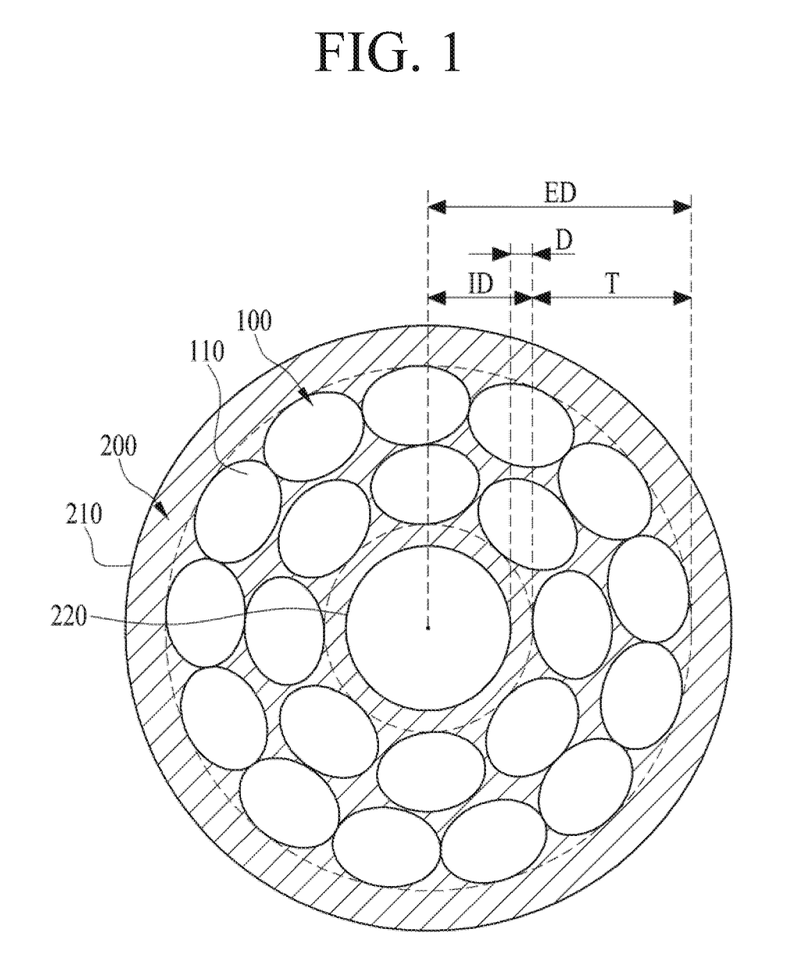
FIG. 1 is a schematic cross-sectional view of a composite hollow fiber membrane in accordance with one embodiment of the present invention.

FIG. 1 is a schematic cross-sectional view of a composite hollow fiber membrane in accordance with one embodiment of the present invention.

As exemplarily shown in FIG. 1, a composite hollow fiber membrane in accordance with the present invention includes a tubular polymer membrane 200 having an outer surface 210 and an inner surface 220, and a tubular braid 100 disposed between the outer surface 210 and the inner surface 220 of the tubular polymer membrane 200.

The tubular polymer membrane 200 may include at least one of polysulfone resin, polyether sulfone resin, sulfonated polysulfone resin, polyvinylidene fluoride resin or polyacrylonitrile resin, polyimide resin, polyamideimide resin and polyesterimide resin.

The polymer membrane 200 may include a skin layer having a dense structure and an inner layer having a sponge structure. Micro-pores having a diameter of 0.01~1 μm are formed in the skin layer, and micro-pores having a diameter of 10 μm or less, preferably, a diameter of 5 μm or less, are formed in the inner layer.

There are no defective parts having a size exceeding 10 μm, i.e., micro-pores having a diameter exceeding 10 μm, in the inner layer of the polymer layer 200 of the present invention. If there are defective parts having size exceeding 10 μm, filtration reliability may be greatly reduced.

The tubular braid 100 includes a plurality of yarns 110. In accordance with one embodiment of the present invention, the tubular braid 100 may be manufactured using 8 to 60 yarns 110 having fineness of 150 to 800 denier.

The tubular braid 100 in accordance with one embodiment of the present invention has an external diameter ED of 1.2 to 2.0 mm. If the external diameter ED of the tubular braid 100 is less than 1.2 mm, the internal diameter of the composite hollow fiber membrane is excessively decreased and thus causes an excessively low flux of water permeating the composite hollow fiber membrane. On the other hand, if the external diameter ED of the tubular braid 100 exceeds 2.0 mm, when the cross-section of a bundle of composite hollow fiber membranes occupies a designated area, the membrane surface area of the composite hollow fiber membrane bundle may not be meaningfully increased.

In order to increase the membrane surface area of the composite hollow fiber membrane bundle, decrease in the external diameter ED of the tubular braid 100 is important but decrease in the thickness T of the tubular braid 100 is just as important as decrease in the external diameter ED. The reason for this is that, if the internal diameter ID of the tubular braid 10 is decreased in proportion to decrease in the external diameter ED of the tubular braid 10, increase in a flux of water permeating the composite hollow fiber membrane may not be expected.

Therefore, in accordance with one embodiment of the present invention, a ratio of the thickness T of the tubular braid 100 to the external diameter ED of the tubular braid 100 is 15 to 35%.

If the ratio of the thickness T of the tubular braid 100 to the external diameter ED of the tubular braid 100 exceeds 35%, i.e., if the thickness T of the tubular braid 100 is excessively increased, as compared to the external diameter ED, the internal diameter ID of the tubular braid 100 is decreased to reduce a flow of filtered water along the hollow of the composite hollow fiber membrane, and the amount of a fluid permeating the membrane is reduced due to increase in the thickness of the composite hollow fiber membrane.

On the other hand, if the ratio of the thickness T of the tubular braid 100 to the external diameter ED of the tubular braid 100 is less than 15%, i.e., if the thickness T of the tubular braid 100 is excessively decreased, as compared to the external diameter ED, the function of the tubular braid 100 as a reinforcing material may not be secured due to reduction in mechanical strength.

Therefore, in accordance with one embodiment of the present invention, the tubular braid 100 has an external diameter ED of 1.2 to 2.0 mm and a thickness T of 0.2 to 0.7 mm.

In accordance with one embodiment of the present invention, a distance D between the inner surface 220 of the polymer membrane 200 and the tubular braid 100 is 1 to 50% of the thickness T of the tubular braid 100.

If the distance D is less than 1% of the thickness T of the tubular braid 100, peel strength of the composite hollow fiber membrane may not be meaningfully improved, and the non-uniform shape of the tubular braid 100 is intactly transferred to the inner surface 220 of the polymer membrane 200 and thus resistance to a fluid flow in the composite hollow fiber membrane may not be reduced to a target degree.

On the other hand, if the distance D exceeds 50% of the thickness T of the tubular braid 100, the hollow of the composite hollow fiber membrane is excessively narrowed and resistance to a fluid flow in the composite hollow fiber membrane is increased.

In the present invention, the external diameter ED, the internal diameter ID and the thickness T of the tubular braid 100, and the distance D between the inner surface 220 of the polymer membrane 200 and the tubular braid 100 are measured by a method which will be described below.

Samples are acquired by cutting arbitrary points of the composite hollow fiber membrane perpendicular to the length direction thereof using a cross-section cutting microtome of an FE-SEM and then the cross-sections of the samples are analyzed by the FE-SEM. 5 samples, which have deviations of within 20% between the maximum lengths and minimum lengths of the external diameter ED and the internal diameter ID of the tubular braid 100, are selected. In the selected samples, the external diameter ED of the tubular braid 100 is determined as a mean value of the maximum external diameter and the minimum external diameter, the internal diameter ID of the tubular braid 100 is determined as a mean value of the maximum internal diameter and the minimum internal diameter, and the distance D between the inner surface 220 of the polymer membrane 200 and the tubular braid 100 is determined as a mean value of the maximum distance and the minimum distance. The external diameter ED and the internal diameter ID of the tubular braid 100 and the distance D between the inner surface 220 of the polymer membrane 200 and the tubular braid 100 are finally acquired by respectively calculating arithmetic means of the external diameters ED and the internal diameters ID of the tubular braid 100 and the distances D between the inner surface 220 of the polymer membrane 200 and the tubular braid 100 in the 5 samples. The thickness T of the tubular braid 100 (meaning the mean thickness) is a difference between the external diameter ED and the internal diameter ID of the tubular braid 100.

Figure 2:
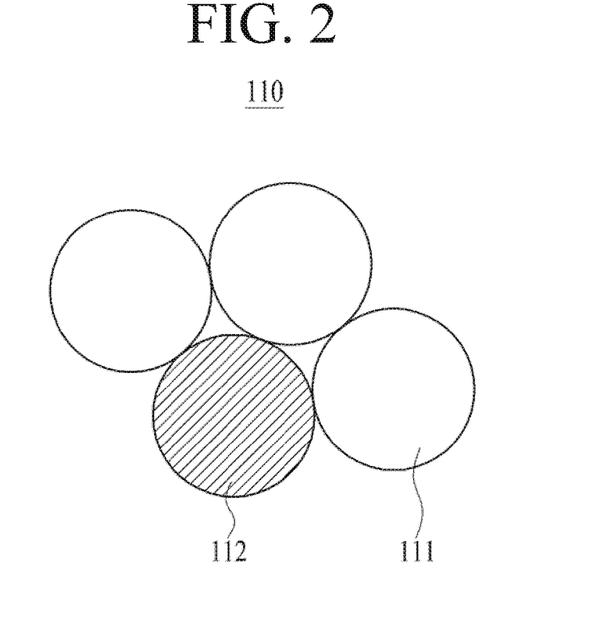
FIG. 2 is a schematic cross-sectional view of a yarn in accordance with one embodiment of the present invention.

FIG. 2 is a schematic cross-sectional view of a yarn 110 in accordance with one embodiment of the present invention.

As exemplarily shown in FIG. 2, each of the yarns 110 of the present invention includes first multifilaments 111 and second multifilaments 112. The first multifilaments 111 may have fineness of 100 to 600 denier, and the second multifilaments 112 may have fineness of 10 to 200 denier.

Each yarn 110 may include 1 to 4 first multifilaments 111 and 1 to 4 second multifilaments 112, and the sum of the number of the first multifilaments 111 and the number of the second multifilaments 112 included in each yarn 110 may be three or more.

Figure 3:
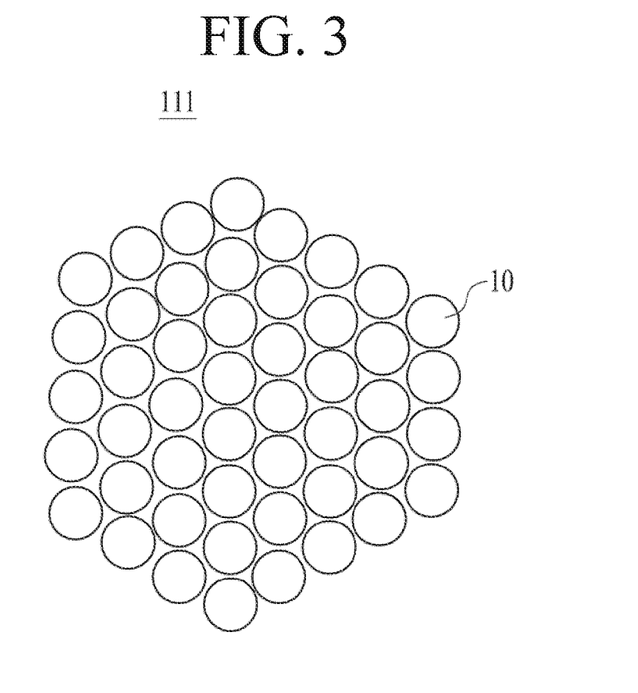
FIG. 3 is a schematic cross-sectional view of a thick multifilament in accordance with one embodiment of the present invention.
Figure 4:
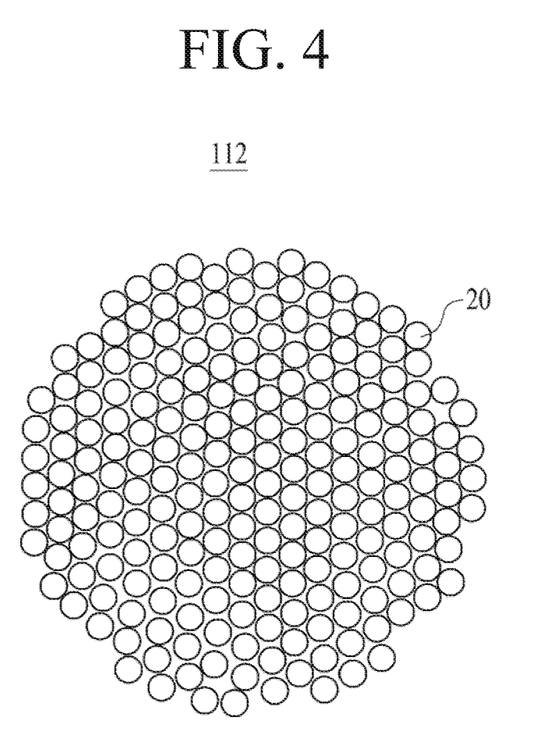
FIG. 4 is a schematic cross-sectional view of a middle multifilament in accordance with one embodiment of the present invention.

FIGS. 3 and 4 are schematic cross-sectional views of the first and second multifilaments 111 and 112 of the present invention, respectively.

As exemplarily shown in FIGS. 3 and 4, the first multifilament 111 of the present invention is a thick multifilament including a plurality of first monofilaments having fineness of 3 to 50 denier, and the second multifilament 112 of the present invention is a middle multifilament including a plurality of second monofilaments having fineness of 0.4 to 3 denier.

Instead of thin multifilaments, the tubular braid 100 having the thick multifilaments 111 has relatively large pores and may thus greatly improve water permeability and peel strength of the composite hollow fiber membrane.

In more detail, since the tubular braid 100 has large pores, when the polymer membrane 200 is formed, a polymer solution may pass through the tubular braid 100 in the thickness direction thereof and the inner surface 220 of the composite hollow fiber membrane 200 may be smoothed. The large pores of the tubular braid 100 and the smooth inner surface 220 of the composite hollow fiber membrane 200 improve water permeability of the composite hollow fiber membrane. Further, the polymer solution passes through the tubular braid 100 in the thickness direction thereof and thereby forms a structure in which the tubular braid 100 is completely embedded in the polymer membrane 200, thus greatly improving peel strength of the composite hollow fiber membrane.

The tubular braid 100 of the present invention further includes the middle multifilaments 112 in addition to the thick multifilaments 111 and may prevent an excessively large amount of the polymer solution from passing through the tubular braid 100 in the thickness direction thereof, thereby preventing the hollow of the composite hollow fiber membrane from clogging.

The first multifilament 111 may include 30 to 150 first monofilaments 10, and the second multifilament 112 may include 20 to 100 second monofilaments 20.

The first and second monofilaments 10 and 20 may include at least one of polyolefin resin, polyethylene terephthalate resin and polyamide resin.

Hereinafter, a manufacturing method of a composite hollow fiber membrane in accordance with one embodiment of the present invention will be described in detail.

First, a tubular braid 100 is manufactured. The manufacturing method of the tubular braid 100 includes manufacturing first multifilaments 111, each of which includes a plurality of first monofilaments 10 having fineness of 3 to 50 denier, manufacturing second multifilaments 112, each of which includes a plurality of second monofilaments 20 having fineness of 0.4 to 3 denier, manufacturing a plurality of yarns 110 using the first multifilaments 111 and the second multifilaments 112, and braiding the yarns 110.

Hereinafter, a polymer membrane 200 is formed by supplying a polymer solution to the outer surface of the tubular braid 100 completed by braiding the yarns 110, thereby completing manufacture of a composite hollow fiber membrane.

The polymer solution may be manufactured by dissolving a polymer resin and additives (polyvinylpyrrolidone and/or a hydrophilic compound) in an organic solvent. The polymer solution may include 10-50% by weight of a polymer resin, 1-30% by weight of additives (polyvinylpyrrolidone and/or a hydrophilic compound) and 20-89% by weight of an organic solvent.

The polymer resin may be polysulfone resin, polyether sulfone resin, sulfonated polysulfone resin, polyvinylidene fluoride (PVDF) resin, polyacrylonitrile (PAN) resin, polyimide resin, polyamideimide resin or polyesterimide resin.

The organic solvent may be dimethylacetamide, dimethylformamide, or a mixture thereof.

As the hydrophilic compound, water or a glycol-based compound, particularly, polyethylene glycol having a molecular weight of 2,000 or less, may be used. The hydrophilic compound serves to lower stability of the polymer solution and thus relatively increases possibility that a sponge-type structure appears in the polymer membrane 200. That is, as stability of the polymer solution increases, defective parts (micro-pores having a diameter exceeding 10 µm) are formed in the polymer membrane 200 and thus there is a high possibility that the polymer membrane 200 has a finger-like structure. Therefore, by employing a hydrophilic compound, water or a glycol-based compound, as additives, stability of the polymer solution may be reduced and simultaneously the polymer membrane 200 may be hydrophilized to increase water permeability of the composite hollow fiber membrane.

Supply of the polymer solution to the outer surface of the tubular braid 100 may be executed in a manner in which the polymer solution passes through the tubular braid 100 in the thickness direction of the tubular braid 100.

For example, supply of the polymer solution to the outer surface of the tubular braid 100 may include causing the tubular braid 100 to pass through an inner tube of a double tubular nozzle, and spinning the polymer solution through an outer tube of the double tubular nozzle. The spun polymer solution is applied to the outer surface of the tubular braid 100 passing through the inner tube and passes through the tubular braid 100 in the thickness direction of the tubular braid 100.

The polymer solution together with the tubular braid 100 is discharged to the air from the double tubular nozzle and then coagulates in a coagulant. Thereafter, washing and drying processes are sequentially executed.

In order to uniformize the thickness of the polymer membrane 200 formed by coagulating the polymer solution, the progress speed of the tubular braid 100 and the amount of the polymer solution introduced into the outer tube of the double tubular nozzle should be balanced, and relations between the supply speed (Q) of the polymer solution and the speed (υ) of the tubular braid 100 are expressed as an Equation below.

$$Q = \pi \rho \upsilon D_o T \quad \text{[Equation]}$$

Here, Q denotes the amount of the polymer solution supplied per unit time, ρ denotes the density of the polymer solution, υ denotes the progress speed of the tubular braid 100, $D_o$ denotes the external diameter of the tubular braid 100, and T denotes the thickness of the polymer membrane 200.

As can be seen the above Equation, the thickness T of the polymer membrane 200 may be adjusted using the amount of the supplied polymer solution, the density of the polymer solution, the progress speed of the tubular braid 100, etc.

Alternatively, supply of the polymer solution may be executed by dipping the tubular braid 100 in the polymer solution. After such a dipping process, drying/heating processes are additionally executed.

Hereinafter, the present invention will be described in more detail through the examples and Comparative examples.

Manufacture of Tubular Braid

Example 1

A yarn is manufactured by combining three thick multifilaments, each of which includes 48 PET monofilaments having fineness of 3.125 denier, and one middle multifilament including 36 PET monofilaments having fineness of 2.083 denier. A tubular braid having an external diameter of 1.4 mm is manufactured by braiding 20 such yarns.

Comparative Example 1

A yarn is manufactured by combining three thick multifilaments, each of which includes 48 PET monofilaments having fineness of 3.125 denier. A tubular braid having an external diameter of 1.4 mm is manufactured by braiding 20 such yarns.

Comparative Example 2

A yarn is manufactured by combining six thin multifilaments, each of which includes 216 PET monofilaments having fineness of 0.3 denier. A tubular braid having an external diameter of 2.4 mm is manufactured by braiding 12 such yarns.

Comparative Example 3

A yarn is manufactured by combining three thin multifilaments, each of which includes 216 PET monofilaments having fineness of 0.3 denier, and one thick multifilament including 48 PET monofilaments having fineness of 7.5 denier. A tubular braid having an external diameter of 2.1 mm is manufactured by braiding 20 such yarns.

Comparative Example 4

A yarn is manufactured by combining three thin multifilaments, each of which includes 200 PET monofilaments having fineness of 0.31 denier, and one middle multifilament including 72 PET monofilaments having fineness of 2 denier. A tubular braid having an external diameter of 1.8 mm is manufactured by braiding 20 such yarns.

Manufacture of Polymer Solution

A transparent polymer solution is manufactured by dissolving 17% by weight of polysulfone, 9% by weight of polyvinylpyrrolidone and 10% by weight of polyethylene glycol in 64% by weight of dimethylformamide (an organic solvent) while stirring.

Manufacture of Composite Hollow Fiber Membrane

EXAMPLE 2

The polymer solution is supplied to a double tubular nozzle including an outer tube (having a diameter of 2.38 mm) and, simultaneously, the tubular braid manufactured by Example 1 passes through an inner tube of the double tubular nozzle. Here, the rate (k) of the progress speed of the tubular braid to the supply speed of the polymer solution is set to 750 g/m². The tubular braid to which the polymer solution is supplied passes through an air gap of 10 cm and then sequentially passes through a coagulating bath having a temperature of 35° C. and a cleaning bath, thereby manufacturing a composite hollow fiber membrane.

Comparative Example 5

A composite hollow fiber membrane is manufactured in the same manner as Example 2 except that, instead of the tubular braid manufactured by Example 1, the tubular braid manufactured by Comparative example 1 is used.

Comparative Example 6

A composite hollow fiber membrane is manufactured in the same manner as Example 2 except that, instead of the tubular braid manufactured by Example 1, the tubular braid manufactured by Comparative example 2 is used.

Comparative Example 7

A composite hollow fiber membrane is manufactured in the same manner as Example 2 except that, instead of the tubular braid manufactured by Example 1, the tubular braid manufactured by Comparative example 3 is used.

Comparative Example 8

A composite hollow fiber membrane is manufactured in the same manner as Example 2 except that, instead of the tubular braid manufactured by Example 1, the tubular braid manufactured by Comparative example 4 is used.

Water permeabilities and peel strengths of the composite hollow fiber membranes manufactured by Example 2 and Comparative examples 5 to 8 are measured through methods, which will be described below, and Table 1 states acquired results.

Water Permeability (Lp)

An acrylic tube having a diameter of 10 mm and a length of 170 mm and a composite hollow fiber membrane are prepared. The composite hollow fiber membrane is cut to have a length of 160 mm and one end of the cut composite hollow fiber membrane is sealed with an adhesive. The cut composite hollow fiber membrane is put into the acrylic tube and then a space between one end of the acrylic tube and the cut composite hollow fiber membrane is sealed. Thereafter, under the condition that pure water is poured into the acrylic tube and nitrogen pressure is applied thereto, the amount of pure water permeating the composite hollow fiber membrane for 1 minute is measured. The unit of the water permeability (Lp) is ml/(cm²×min×kg/cm²).

Peel Strength

Load at the moment when a polymer membrane peels off from a tubular braid is measured using a tensile tester, and peel strength is calculated by dividing the measured load by an area (m²) to which shear strength is applied. Detailed measurement conditions are given below.

Measuring instrument: Instron 4303
Load cell: 1 KN
Crosshead speed: 25 mm/min
Grasp distance: 50 mm
Specimen: manufactured by attaching and fixing 1 composite hollow fiber membrane strand to a polypropylene tube having a diameter of 6 mm using polyurethane resin so that the length of the attached part becomes 10 cm.

Peel strength($Pa$)=load of yield point (kg)/area to which shear strength is applied (m²)

Peel strength is defined as shear strength per unit area, which is applied to a coated polymer membrane during tension of the specimen, and the area to which shear strength is applied (m²) is calculated as "$\pi$×external diameter (m) of composite hollow fiber membrane (m)×length (m) of attached part of composite hollow fiber membrane".

TABLE 1

| | | Composite hollow fiber membrane | |
|---|---|---|---|
| | Yarn of tubular braid | Water permeability [ml/(cm² × min × kg/cm²)] | Peel strength (kg/m²) |
| Test example 2 | 3 thick multifilaments + 1 middle multifilament | 3.0 | 1.7 |
| Comparative example 5 | 3 thick multifilaments | 0.5 | 1.3 |
| Comparative example 6 | 6 thin multifilaments | 1.5 | 1.5 |
| Comparative example 7 | 3 thin multifilaments + 1 thick multifilament | 2.0 | 1.0 |
| Comparative example 8 | 3 thin multifilaments + 1 middle multifilament | 1.8 | 1.2 |

As can be seen from above Table 1, the composite hollow fiber membrane of Example 2 manufactured using the tubular braid including thick multifilaments without thin multifilaments has excellent water permeability and peel strength, as compared to the composite hollow fiber membranes of Comparative examples 6 to 8 respectively manufactured using the tubular braids including thin multifilaments.

The tubular braid of the composite hollow fiber membrane of Example 2 has large pores and, thus, when a polymer membrane is formed, a polymer solution passes through the tubular braid in the thickness direction thereof and a smooth surface is formed as the inner surface of the composite hollow fiber membrane. On the other hand, the tubular braids of the composite hollow fiber membranes of Comparative examples 6 to 8 have relatively small pores due to presence of thin multifilaments and, thus, the polymer solution may not pass through the tubular braids in the thickness direction thereof and consequently the non-uniform inner surfaces of the tubular braids are formed as the inner surfaces of the composite hollow fiber membranes.

Accordingly, it may be understood that the composite hollow fiber membrane of Example 2 has improved water permeability due to large pores of the tubular braid and the smooth inner surface of the composite hollow fiber membrane, as compared to the composite hollow fiber membranes of Comparative examples 6 to 8. Further, it may be understood that a structure in which the tubular braid is completely embedded in the polymer membrane is formed and thus peel strength of the composite hollow fiber membrane is improved.

The composite hollow fiber membrane of Comparative example 5 manufactured using the tubular braid including thick multifilaments alone has similar peel strength to the composite hollow fiber membrane of Example 2 but has remarkably lower water permeability than the composite hollow fiber membrane of Example 2. The reason for this is that an excessively large amount of the polymer solution passes through the tubular braid and the hollow of the composite hollow fiber membrane is excessively narrowed so as to almost become clogged.

As apparent from the above description, in a composite hollow fiber membrane and a manufacturing method thereof in accordance with the present invention, a tubular braid having relatively large pores may be manufactured using thick multifilaments instead of thin multifilaments and, consequently, peel strength as well as water permeability of the composite hollow fiber membrane may be greatly improved.

In more detail, the tubular braid has large pores and, thus, when a polymer membrane is formed, a polymer solution passes through the tubular braid in the thickness direction thereof and a smooth surface is formed as the inner surface of the composite hollow fiber membrane. The composite hollow fiber membrane may have improved water permeability due to the large pores of the tubular braid and the smooth inner surface of the composite hollow fiber membrane. Further, since the polymer solution passes through the tubular braid in the thickness direction thereof, a structure in which the tubular braid is completely embedded in the polymer membrane is formed and thus peel strength of the composite hollow fiber membrane may be greatly improved.

Further, in the composite hollow fiber membrane and the manufacturing method thereof in accordance with the present invention, by using middle multifilaments together with the thick multifilaments, an excessively large amount of the polymer solution may be prevented from passing through the tubular braid in the thickness direction thereof so as to prevent clogging of the hollow of the composite hollow fiber membrane.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composite hollow fiber membrane comprising:
   a tubular polymer membrane having an outer surface and an inner surface; and
   a tubular braid disposed between the outer surface and the inner surface of the tubular polymer membrane, wherein:
   the tubular braid comprises a plurality of yarns;
   each of the plurality of yarns includes at least one first multifilament and at least one second multifilament;
      wherein the first multifilament includes a plurality of first monofilaments having fineness of 3 to 50 denier; and
      wherein the second multifilament includes a plurality of second monofilaments having fineness of at least 2,083 denier but less than 3 denier.

2. The composite hollow fiber membrane according to claim 1, wherein:
   the first multifilament includes 30 to 150 first monofilaments; and
   the second multifilament includes 20 to 100 second monofilaments.

3. The composite hollow fiber membrane according to claim 1, wherein:
   the first multifilament has fineness of 100 to 600 denier; and
   the second multifilament has fineness of 10 to 200 denier.

4. The composite hollow fiber membrane according to claim 1, wherein each of the yarns includes 1 to 4 first multifilaments and 1 to 4 second multifilaments,
   wherein the sum of the number of the first filaments and the number of the second multifilaments included in each yarn is three or more.

5. The composite hollow fiber membrane according to claim 1, wherein each of the yarns has fineness of 150 to 800 denier.

6. The composite hollow fiber membrane according to claim 1, wherein the tubular braid comprises 8 to 60 yarns.

7. The composite hollow fiber membrane according to claim 1, wherein:
   the first and second monofilaments include at least one of polyolefin resin, polyethylene terephthalate resin and polyamide resin; and
   the polymer membrane includes at least one of polysulfone resin, polyether sulfone resin, sulfonated polysulfone resin, polyvinylidene fluoride resin, polyacrylonitrile resin, polyimide resin, polyamideimide resin and polyesterimide resin.

8. The composite hollow fiber membrane according to claim 1, wherein:
   the tubular braid has an external diameter of 1.2 to 2.0 mm; and
   a ratio of the thickness of the tubular braid to the external diameter of the tubular braid is 15 to 35%.

9. The composite hollow fiber membrane according to claim 8, wherein a distance between the inner surface of the polymer membrane and the tubular braid is 1 to 50% of the thickness of the tubular braid.

* * * * *